United States Patent
Appuswamy et al.

(10) Patent No.: US 9,798,972 B2
(45) Date of Patent: Oct. 24, 2017

(54) FEATURE EXTRACTION USING A NEUROSYNAPTIC SYSTEM FOR OBJECT CLASSIFICATION

(71) Applicant: INTERNATIONAL BUSINESS MACHINES CORPORATION, Armonk, NY (US)

(72) Inventors: Rathinakumar Appuswamy, San Jose, CA (US); Steven K. Esser, San Jose, CA (US); Dharmendra S. Modha, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 550 days.

(21) Appl. No.: 14/322,776

(22) Filed: Jul. 2, 2014

(65) Prior Publication Data
US 2016/0004961 A1     Jan. 7, 2016

(51) Int. Cl.
   *G06F 15/18*     (2006.01)
   *G06N 3/063*     (2006.01)
   *G06N 3/04*     (2006.01)

(52) U.S. Cl.
   CPC ............. *G06N 3/063* (2013.01); *G06N 3/049* (2013.01)

(58) Field of Classification Search
   CPC ........................................................ G06N 3/02
   USPC ...................................................... 706/12, 45
   See application file for complete search history.

(56) References Cited

U.S. PATENT DOCUMENTS

| | | | |
|---|---|---|---|
| 5,634,087 A | 5/1997 | Mammone et al. | |
| 6,018,740 A | 1/2000 | Ito | |
| 6,670,963 B2 | 12/2003 | Osberger | |
| 6,757,666 B1 | 6/2004 | Thomas | |
| 7,636,098 B2 | 12/2009 | Yang et al. | |
| 7,707,128 B2 | 4/2010 | Matsugu | |
| 7,958,071 B2 | 6/2011 | Snider et al. | |
| 8,098,886 B2 | 1/2012 | Koch et al. | |
| 8,332,340 B2 | 12/2012 | Snider | |
| 8,369,652 B1 | 2/2013 | Khosla et al. | |
| 8,385,654 B2 | 2/2013 | Gu et al. | |

(Continued)

FOREIGN PATENT DOCUMENTS

| | | | |
|---|---|---|---|
| CN | 102088597 A | 6/2011 | |
| CN | 102864499 A | 1/2013 | |

OTHER PUBLICATIONS

Andreopoulos, A. et al., "Visual saliency on networks of neurosynaptic cores", Mar. 2015, pp. 1-16, vol. 59, No. 2-3, IBM, United States.

(Continued)

*Primary Examiner* — David Vincent
(74) *Attorney, Agent, or Firm* — Sherman IP LLP; Kenneth L. Sherman; Hemavathy Perumal

(57) ABSTRACT

Embodiments of the invention provide a neurosynaptic system comprising a first set of one or more neurosynaptic core circuits configured to receive input data comprising multiple input regions, and extract a first set of features from the input data. The features of the first set are computed based on different input regions. The system further comprises a second set of one or more neurosynaptic core circuits configured to receive the first set of features, and generate a second set of features by combining the first set of features based on synaptic connectivity information of the second set of core circuits.

20 Claims, 13 Drawing Sheets

(56) References Cited

U.S. PATENT DOCUMENTS

| | | |
|---|---|---|
| 8,401,297 B1 | 3/2013 | Apostolos et al. |
| 8,538,074 B2 | 9/2013 | Nakamura et al. |
| 8,626,686 B1 | 1/2014 | Rhodes |
| 8,699,767 B1 | 4/2014 | Khosla et al. |
| 8,731,302 B2 | 5/2014 | Eshima |
| 8,774,498 B2 | 7/2014 | De Campos |
| 8,907,971 B2 | 12/2014 | Ballestad et al. |
| 8,972,315 B2 | 3/2015 | Szatmary |
| 8,977,582 B2 | 3/2015 | Richert |
| 8,990,130 B2 | 3/2015 | Alvarez-Icaza Rivera |
| 9,014,467 B2 | 4/2015 | Hu et al. |
| 9,042,659 B2 | 5/2015 | Adamek et al. |
| 9,070,039 B2 | 6/2015 | Richert |
| 9,123,127 B2 | 9/2015 | Richert |
| 9,159,020 B2 | 10/2015 | Alcarez-Icaza Rivera |
| 9,218,563 B2 | 12/2015 | Szatmary |
| 9,239,985 B2 | 1/2016 | Piekniewski et al. |
| 9,262,712 B2 | 2/2016 | Modha |
| 2002/0154833 A1 | 10/2002 | Koch et al. |
| 2005/0190966 A1 | 9/2005 | Etienne-Cummings et al. |
| 2006/0182339 A1 | 8/2006 | Connell |
| 2008/0089591 A1 | 4/2008 | Zhou |
| 2008/0201282 A1 | 8/2008 | Garcia et al. |
| 2010/0172584 A1 | 7/2010 | Lukac et al. |
| 2010/0241601 A1 | 9/2010 | Carson et al. |
| 2010/0312730 A1 | 12/2010 | Weng et al. |
| 2012/0011089 A1 | 1/2012 | Aparin |
| 2012/0109863 A1 | 5/2012 | Esser et al. |
| 2012/0109864 A1 | 5/2012 | Modha |
| 2012/0109866 A1 | 5/2012 | Modha |
| 2012/0173471 A1 | 7/2012 | Ananthanarayanan et al. |
| 2012/0192048 A1 | 7/2012 | Suzuki et al. |
| 2012/0259804 A1 | 10/2012 | Brezzo |
| 2012/0308076 A1 | 12/2012 | Piekniewski et al. |
| 2013/0018832 A1 | 1/2013 | Ramanathan et al. |
| 2013/0073493 A1 | 3/2013 | Modha |
| 2013/0073496 A1 | 3/2013 | Szatmary |
| 2013/0131985 A1 | 5/2013 | Weiland et al. |
| 2013/0311412 A1 | 11/2013 | Lazar |
| 2014/0143193 A1 | 5/2014 | Zheng et al. |
| 2015/0139537 A1 | 5/2015 | Milner et al. |
| 2015/0242690 A1 | 8/2015 | Richert |
| 2015/0269439 A1 | 9/2015 | Versace |
| 2015/0278628 A1 | 10/2015 | Agrawal |
| 2015/0278641 A1 | 10/2015 | Agrawal |
| 2015/0324684 A1* | 11/2015 | Alvarez-Icaza Rivera ............ G06N 3/04 706/26 |
| 2015/0339589 A1 | 11/2015 | Fisher |
| 2015/0379689 A1 | 12/2015 | Andreopoulos |
| 2016/0321537 A1* | 11/2016 | Akopyan .................. G06F 9/50 |
| 2016/0335535 A1* | 11/2016 | Amir ........................ G06N 3/04 |

OTHER PUBLICATIONS

Sima, H. et al., "Color Image Segmentation Based on Regional Saliency", Proceedings of the 19th International Conference on Neural Information Processing (ICONIP 2012), Part V, Nov. 12-15, 2012, pp. 142-150, Springer Verlag, Germany.

Vogelstein, R.J. et al., "A Multichip Neuromorphic System for Spike-Based Visual Information Processing", Neural Computation, 2007, pp. 2281-2300, vol. 19, Massachusetts Institute of Technology, United States.

Yin, Z. et al., "Likelihood Map Fusion for Visual Object Tracking", Proceedings of the 2008 Winter Workshop on Application of Computer Vision, Mistubishi Electric Research Laboratories, Mar. 2008, pp. 1-9, IEEE, United States.

Yan, W. et al., "Salient Region Detection Algorithm Based on Frequency and Spatial Domain Analysis", Computer Engineering, Sep. 5, 2012, pp. 166-170, Vo. 38, No. 17, China (English-language Abstract attached, p. 1).

Han, J. et al., "Efficient, simultaneous detection of multi-class geospatial targets based on visual saliency modeling and discriminative learning of sparse coding", ISPRS Journal of Photogrammetry and Remote Sensing, Jan. 29, 2014, pp. 37-43, vol. 89, Elsevier, Netherlands.

Joo, M. et al., "Face Recognition With Radial Basis Function (RBF) Neural Networks", Proceedings of IEEE Transactions of Neural Networks, May 2002, pp. 697-710, vol. 13, No. 3, IEEE, United States.

List of IBM Patents or Patent Applications Treated as Related.

Kwak, N. et al., "Input Feature Selection for Classification Problems", Proceedings of the IEEE Transactions on Neural Networks, Jan. 2002, pp. 143-159, vol. 13, No. 1, United States.

Neftci, E. et al., "Synthesizing cognition in neuromorphic electronic systems", Proceedings of the National Academy of Sciences of the United States of America, Jun. 10, 2013, pp. E3468-E3476, vol. 110, No. 37, United States.

Borji, A. et al., "State-of-the-Art in Visual Attention Modeling", Proceedings of the IEEE Transactions on Pattern Analysis and Machines Intelligence, Jan. 2013, pp. 185-207, vol. 35, No. 1, United States.

Tino, P. et al., "Finite Sate Machines and Recurrent Neural Networks—Automata and Dynamical Systems Approaches", Technical Report: UMIACS-TR-95-1 and CS-TR-3396,1998, pp. 1-50, Institute for Advanced Computer Studies, United States.

Masquelier, T. et al., "The timing of vision—how neural processing links to different temporal dynamics", Froniters in Psychology, Jun. 2011, pp. 1-14, vol. 2, Article 151, United States.

* cited by examiner

FEATURE EXTRACTION USING A NEUROSYNAPTIC SYSTEM FOR OBJECT CLASSIFICATION

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in some embodiments, to learning and extracting features using a neurosynaptic system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). Specifically, under the STDP rule, the conductance of a synapse increases if its post-synaptic neuron fires after its pre-synaptic neuron fires, and the conductance of a synapse decreases if the order of the two firings is reversed.

BRIEF SUMMARY

One embodiment provides a neurosynaptic system comprising a first set of one or more neurosynaptic core circuits configured to receive input data comprising multiple input regions, and extract a first set of features from the input data. The features of the first set are computed based on different input regions. The system further comprises a second set of one or more neurosynaptic core circuits configured to receive the first set of features, and generate a second set of features by combining the first set of features based on synaptic connectivity information of the second set of core circuits.

Another embodiment provides a computerized method for feature extraction. The method comprises receiving input data comprising multiple input regions, and extracting a first set of features from the input data. The features of the first set are computed based on different input regions. The method further comprises generating a second set of features by combining the first set of features based on synaptic connectivity information.

These and other features, aspects, and advantages of the present invention will become understood with reference to the following description, appended claims, and accompanying figures.

DETAILED DESCRIPTION

Figure 1:
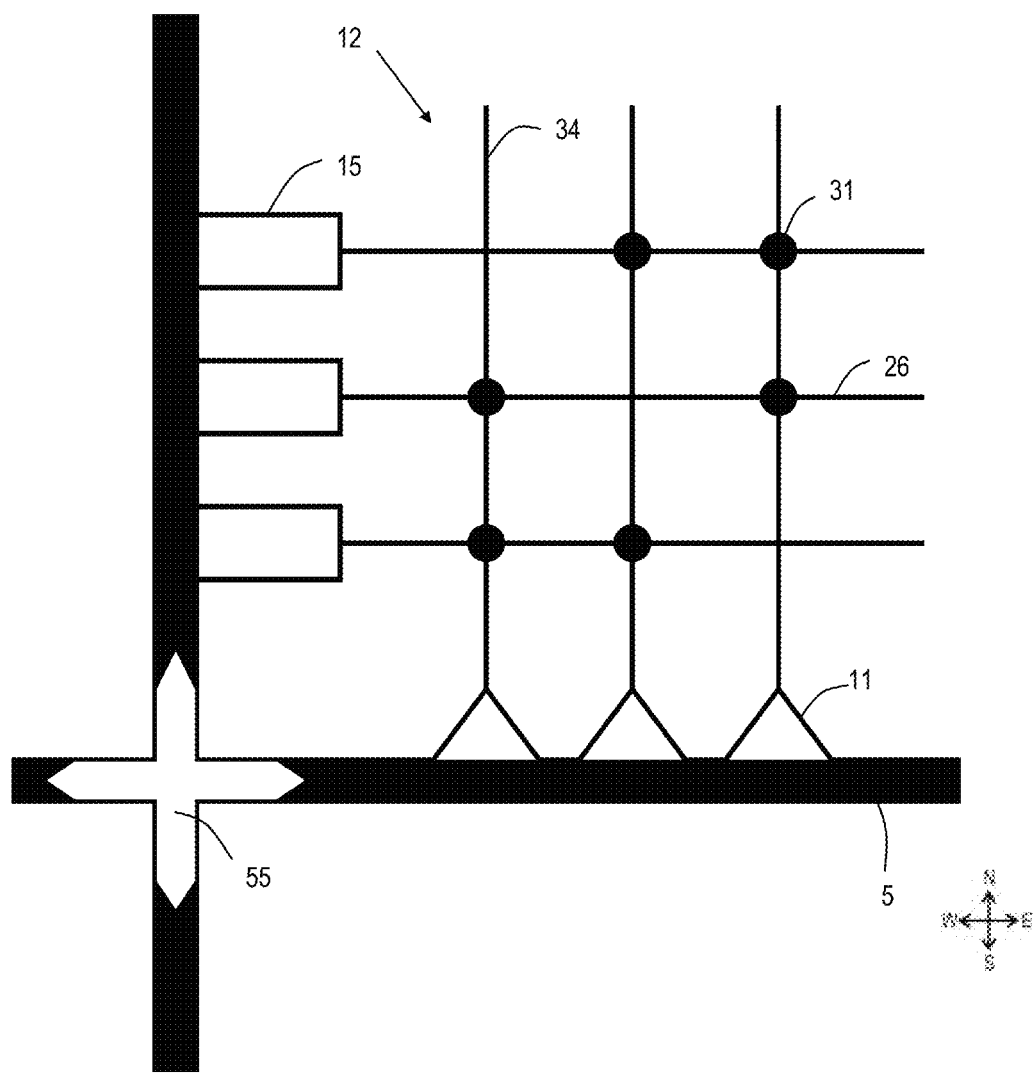
FIG. 1 illustrates an example neurosynaptic core circuit ("core circuit"), in accordance with an embodiment of the invention.

The present invention relates to neuromorphic and synaptronic computation, and in particular, learning and extracting features using a neurosynaptic system. Embodiments of the invention provide a neurosynaptic system comprising a first set of one or more neurosynaptic core circuits configured to receive input data comprising multiple input regions, and extract a first set of features from the input data. The features of the first set are computed based on different input regions. The system further comprises a second set of one or more neurosynaptic core circuits configured to receive the first set of features, and generate a second set of features by combining the first set of features based on synaptic connectivity information of the second set of core circuits.

Embodiments of the invention further provide a computerized method for feature extraction. The method comprises receiving input data comprising multiple input regions, and extracting a first set of features from the input data. The features of the first set are computed based on different input regions. The method further comprises generating a second set of features by combining the first set of features based on synaptic connectivity information.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

FIG. 1 illustrates an example neurosynaptic core circuit ("core circuit") 10, in accordance with an embodiment of the invention. The core circuit 10 in this example comprises a plurality of electronic neurons 11 arranged along the horizontal axis and a plurality of electronic axons 15 arranged along the vertical axis. The neurons 11 and the axons 15 are interconnected via a synaptic crossbar 12, wherein the crossbar 12 has dimensions x×y, and wherein x and y are integers greater than or equal to one. The crossbar 12 comprises multiple electronic synapses 31, multiple rows/axon paths 26, and multiple columns/dendrite paths 34.

Each synapse 31 communicates neuronal firing events (i.e., neural spikes) between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends firing events to the connected axon path 26. Each neuron 11 is connected to a dendrite path 34, such that said neuron 11 receives firing events from the connected dendrite path 34.

In one embodiment, each neuron 11 receives input (e.g., incoming neuronal firing events) from interconnected axons 15 and, in response to the input received, generates output (e.g., outgoing neuronal firing events) according to a neuronal activation function.

Each synapse 31 may have a synaptic weight. The synaptic weights of the synapses 31 is represented by an x×y matrix W, wherein x and y are positive integers. Examples of the use of synaptic weights is described in more detail herein below. A learning rule such as spike-timing dependent plasticity (STDP) may be applied to update the synaptic weights of the synapses 31.

In one embodiment, the synapses 31 are binary memory devices. For example, the synapses 31 are implemented using 1-bit static random-access memory (SRAM) cells. Each synapse 31 has a synaptic weight equal to "0" or "1". In one embodiment, a synapse 31 with a synaptic weight "0" indicates that the synapse 31 is non-conducting. In another embodiment, a synapse 31 with a synaptic weight "0" indicates that the synapse 31 is not connected. In one embodiment, a synapse 31 with a synaptic weight "1" indicates that the synapse 31 is conducting. In another embodiment, a synapse 31 with a synaptic weight "1" indicates that the synapse 31 is connected.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 may have a corresponding router 55. The router 55 is a north(N)-south(S)-east(E)-west(W) mesh router configured to receive incoming address-event router packets targeting axons 15 of the core circuit 10. In one embodiment, each incoming address-event packet includes an incoming neuronal firing event encoded as an address (e.g., an address represented as bits) representing a target axon 15 of the core circuit 10. The axons 15 of the core circuit 10 receive incoming address-event packet from the router 55 via one or more communication paths/channels 5 (e.g., a bus). The router 55 is also configured to send outgoing address-event router packets generated by neurons 11 of the core circuit 10. In one embodiment, each outgoing address-event packet includes an outgoing neuronal firing event encoded as an address (e.g., an address represented as bits) representing a target axon 15 of the same core circuit 10 or a different core circuit 10. The neurons 11 of the core circuit 10 send outgoing address-event packet to the router 55 via one or more communication paths/channels 5 (e.g., a bus).

In one example implementation, the core circuit 10 may comprise 256 neurons 11. The crossbar 12 may be a 256×256 ultra-dense crossbar array that has a pitch in the range of about 0.1 nm to 10 µm.

In one embodiment, soft-wiring in the core circuit 10 is implemented using address events (e.g., Address-Event Representation (AER)). Firing event arrival times included in address events may be deterministic or non-deterministic.

Although certain illustrative embodiments of the invention are described herein using synapses comprising electronic circuits, the present invention is not limited to electronic circuits.

Figure 2:
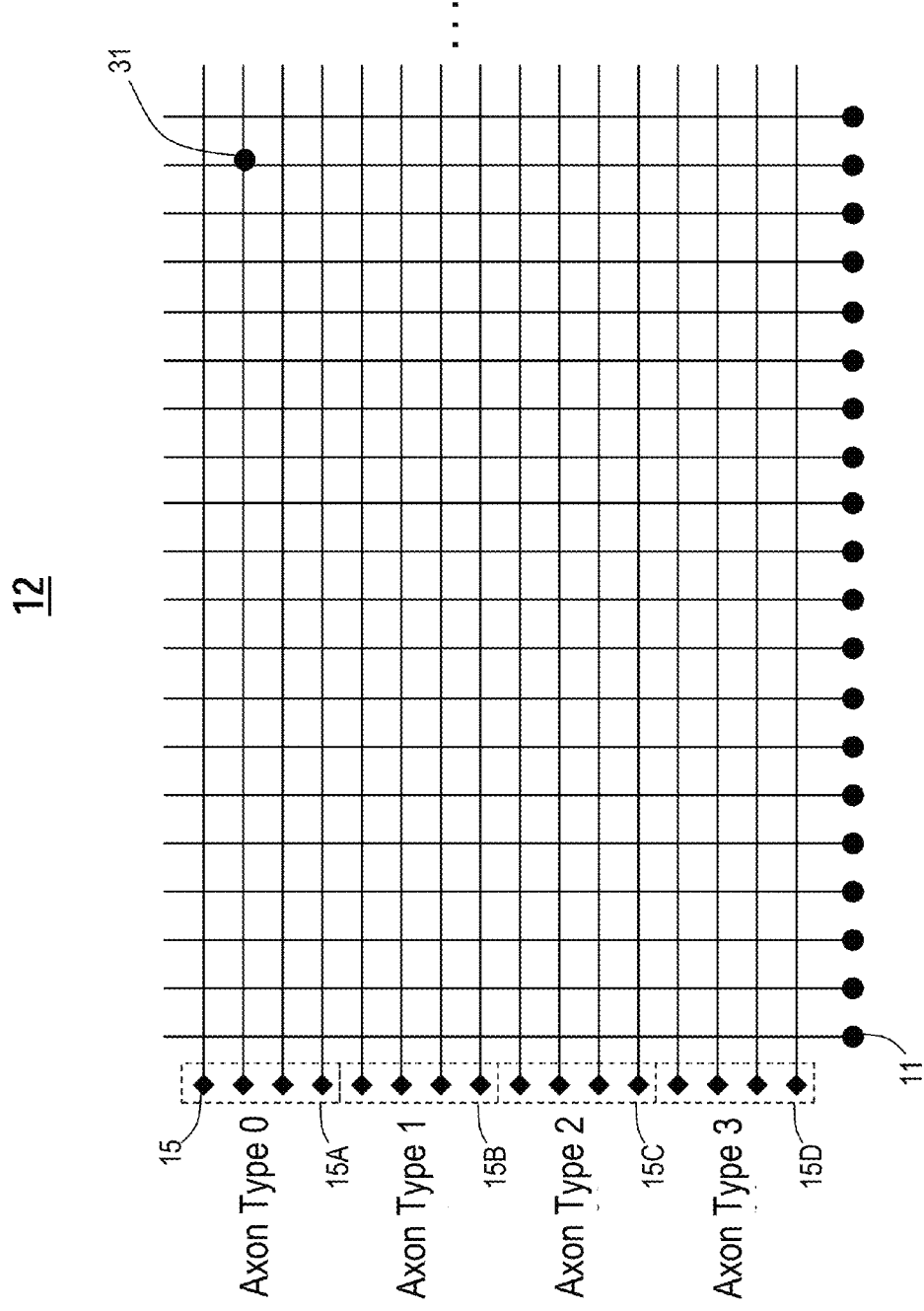
FIG. 2 illustrates an example of a synaptic crossbar of a core circuit (FIG. 1), in accordance with an embodiment of the invention.

FIG. 2 illustrates an example of a synaptic crossbar 12 of a core circuit 10 (FIG. 1), in accordance with an embodiment of the invention. The core circuit 10 receives input (e.g., incoming neuronal firing events) via the axons 15 of the core circuit 10. In one embodiment, each axon 15 has a corresponding axon type. In this example, let $T_j$ generally denote an axon type of a $j^{th}$ axon 15 of the crossbar 12.

In one embodiment, there are four different axon types: Axon Type 0, Axon Type 1, Axon Type 2, and Axon Type 3. As shown in FIG. 2, the axons 15 of the core circuit 10 include a first axon group 15A, a second axon group 15B, a third axon group 15C, and a fourth axon group 15D. Each axon group 15A, 15B, 15C and 15D comprises at least one axon 15. The axon type of each axon 15 of the axon group 15A is Axon Type 0. The axon type of each axon 15 of the axon group 15B is Axon Type 1. The axon type of each axon 15 of the axon group 15C is Axon Type 2. The axon type of each axon 15 of the axon group 15D is Axon Type 3.

The synaptic strength (i.e., connection strength) between a neuron 11 and an axon 15 may be modulated. Each neuron 11 has a corresponding effective synaptic strength for each axon type Ty. In this specification, let $S_{i,Tj}$ generally denote an effective synaptic strength between an $i^{th}$ neuron 11 of the crossbar 12 and a $j^{th}$ axon 15 having an axon type $T_j$. Let $W_{ij}$ represent a synaptic weight of a synapse 31 between the $i^{th}$ neuron 11 and the $j^{th}$ axon 15. When the $i^{th}$ neuron 11 receives input (e.g., an incoming neuronal firing event) from the $j^{th}$ axon 15, a membrane potential variable V of the $i^{th}$ neuron 11 is adjusted based on the effective synaptic strength $S_{i,Tj}$ and the synaptic weight $W_{ij}$.

Figure 3:
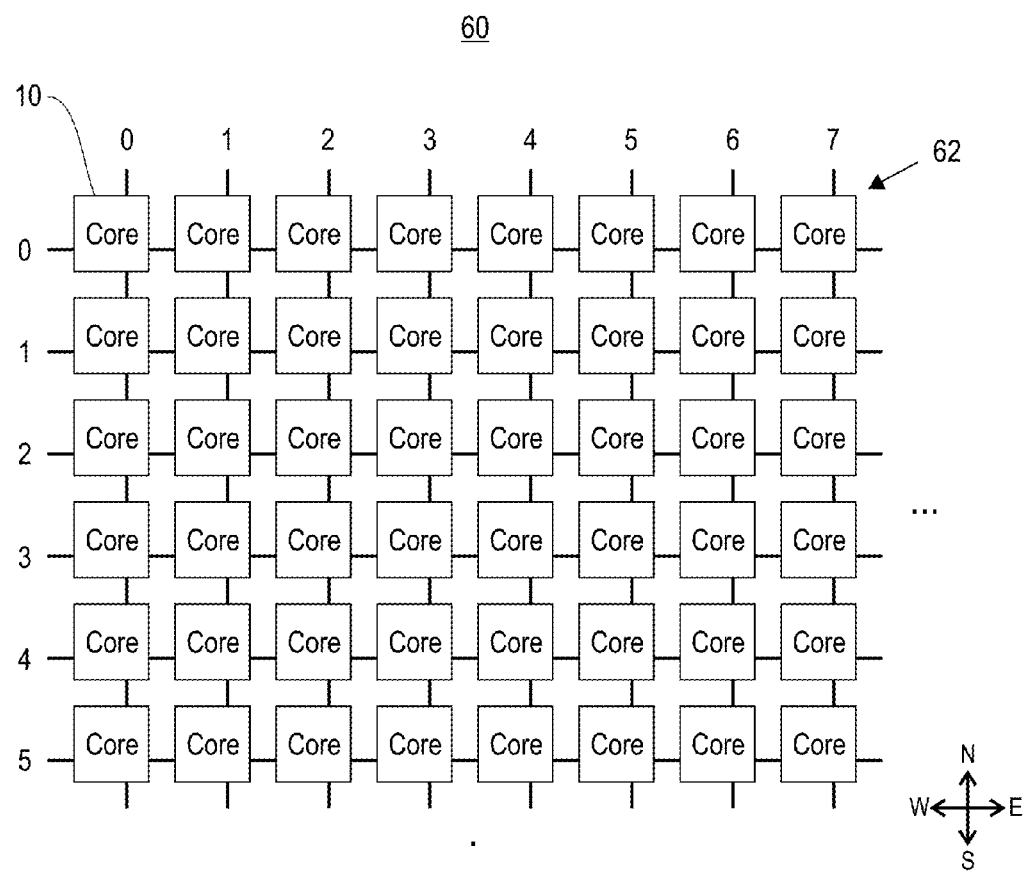
FIG. 3 illustrates an example neurosynaptic network circuit, in accordance with an embodiment of the invention.

FIG. 3 illustrates an example neurosynaptic network circuit 60, in accordance with an embodiment of the invention. The network circuit 60 is an example multi-core neurosynaptic system comprising multiple interconnected core circuits 10. In one embodiment, the core circuits 10 are arranged as a two-dimensional tile-able core array 62. Each core circuit 10 may be identified by its cartesian coordinates as core (i, j), wherein i is a row index and j is a column index of the core array 62 (i.e., core (0,0), core (0,1), . . . , core (5,7)).

Each core circuit 10 utilizes a corresponding router 55 (FIG. 1) to pass along neuronal firing events in the eastbound (E), westbound (W), northbound (W), or southbound (S) direction. For example, a neuron 11 (FIG. 1) associated with the core circuit 10 identified by cartesian coordinates (0,0) (FIG. 3) may generate a firing event targeting an incoming axon 15 (FIG. 1) of the core circuit 10 identified by cartesian coordinates (5,7) (FIG. 3). To reach the core circuit (5,7), the firing event may traverse seven core circuits 10 in the eastbound (E) direction (i.e., from core circuit 10 identified by cartesian coordinates (0,0) to cores (0,1), (0,2), (0,3), (0,4), (0,5), (0,6), and (0,7)), and five core circuits 10 in the southbound (S) direction (i.e., from core circuit 10 identified by the cartesian coordinates (0,7) to cores (1, 7), (2, 7), (3, 7), (4, 7), and (5, 7)) via the routers 55 (FIG. 1) of the network circuit 60 (FIG. 3).

Feature extraction is essential to efficiently process, learn and associate high-dimensional data. One embodiment provides a neurosynaptic system for feature extraction, wherein the system comprises multiple core circuits 10. The system efficiently extracts features from sequences of images, videos or audio. The extracted features may then be used for scene understanding, object classification, pattern recognition, etc.

Figure 4:
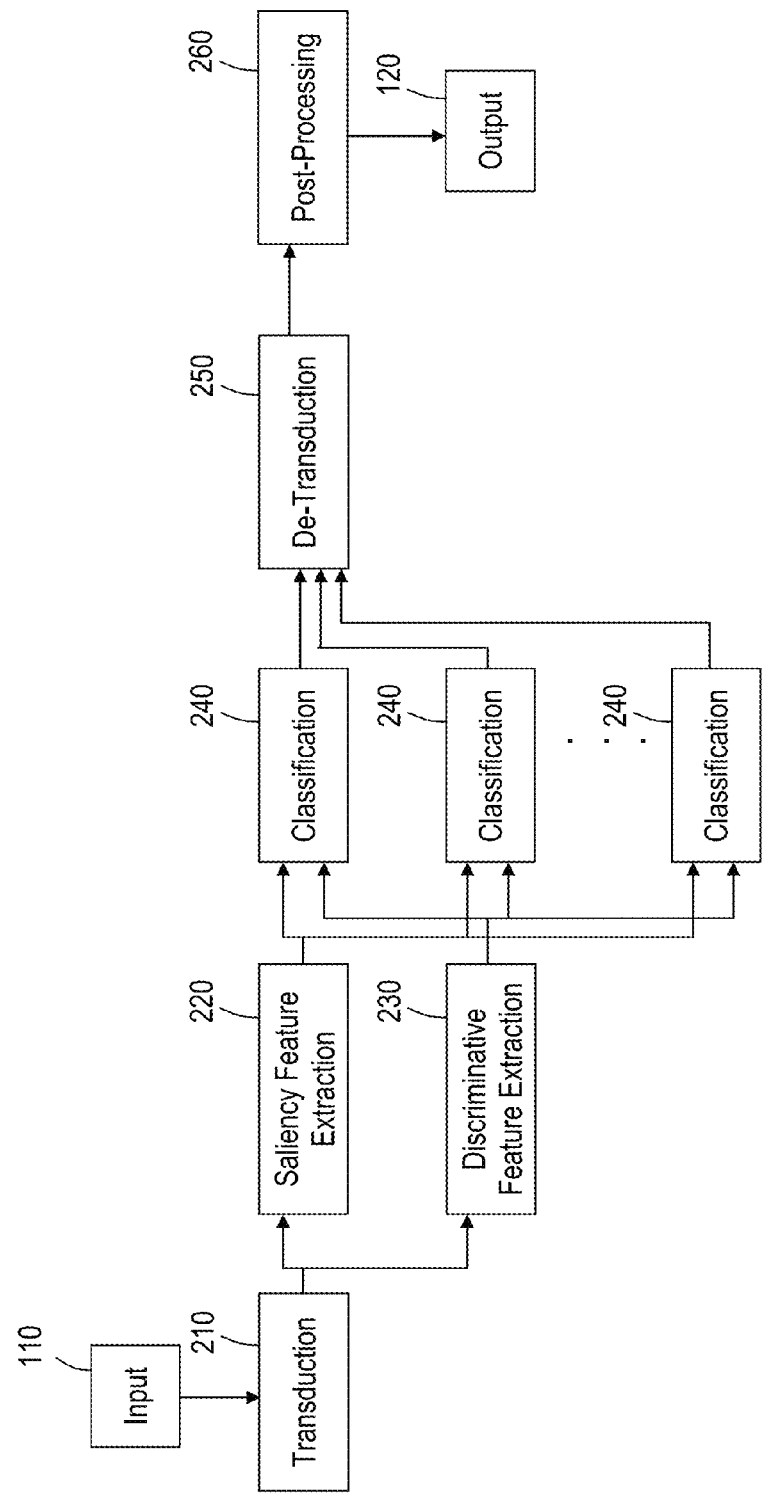
FIG. 4 illustrates an example neurosynaptic system for feature extraction, in accordance with an embodiment of the invention.

FIG. 4 illustrates an example neurosynaptic system 200 for feature extraction, in accordance with an embodiment of the invention. The system 200 receives input data from an external input system 110 (e.g., sensors, a moving camera, etc.). The input data received may comprise sequences of images, videos or audio.

In one embodiment, the input data received comprises input video. The input video comprises a sequence of image frames 150F (FIG. 6), wherein each image frame 150F represents a visual scene. Each image frame 150F comprises a two-dimensional array of pixels.

In this specification, let the term region of interest denote a portion of a visual scene where one or more objects of interest (e.g., a car, a person walking, etc.) are detected. The system 200 determines one or more regions of interest within each image frame 150F of an input video. The system 200 then classifies objects of interest within the regions of interest by assigning a classification label to each object of interest. Each classification label represents a predicated classification for the object of interest.

In one embodiment, the system 200 comprises a transduction unit 210. The transduction unit 210 pre-processes the input data received for feature extraction. In one embodiment, the transduction unit 210 converts each pixel of each image frame 150F to neural spikes (i.e., neuronal firing events). For each pixel, the number of neural spikes generated for the pixel is based on a corresponding pixel intensity value of the pixel.

The system 200 further comprises a saliency feature extraction module 220 for extracting one or more salient features from each image frame 150F. For each image frame 150F, the saliency feature extraction module 220 extracts salient features from the image frame 150F by processing neural spikes for each pixel of the image frame 150F. For each image frame 150F, the saliency feature extraction module 220 generates a corresponding map 410 (FIG. 5) representing salient features extracted from the image frame 150F as well as the regions of the image frame 150F that the salient features were extracted from. In one embodiment, the salient features extracted include motion saliency features and/or spatial saliency features. Motion saliency features are used to detect objects of interest in motion. Spatial saliency features are used to detect objects of interest that are not in motion.

The system 200 further comprises a discriminatory feature extraction module 230 for extracting one or more discriminative features from each image frame 150F. For each image frame 150F, the discriminatory feature extraction module 230 extracts discriminative features from the image frame 150F by processing neural spikes for each pixel of the image frame 150F. For each image frame 150F, the discriminatory feature extraction module 230 generates a corresponding map representing the discriminative features extracted from the image frame 150F as well as the regions of the image frame 150F that the discriminative features were extracted from.

The system 200 further comprises one or more classification units 240. Each classification unit 240 operates as an object classifier.

Figure 7:
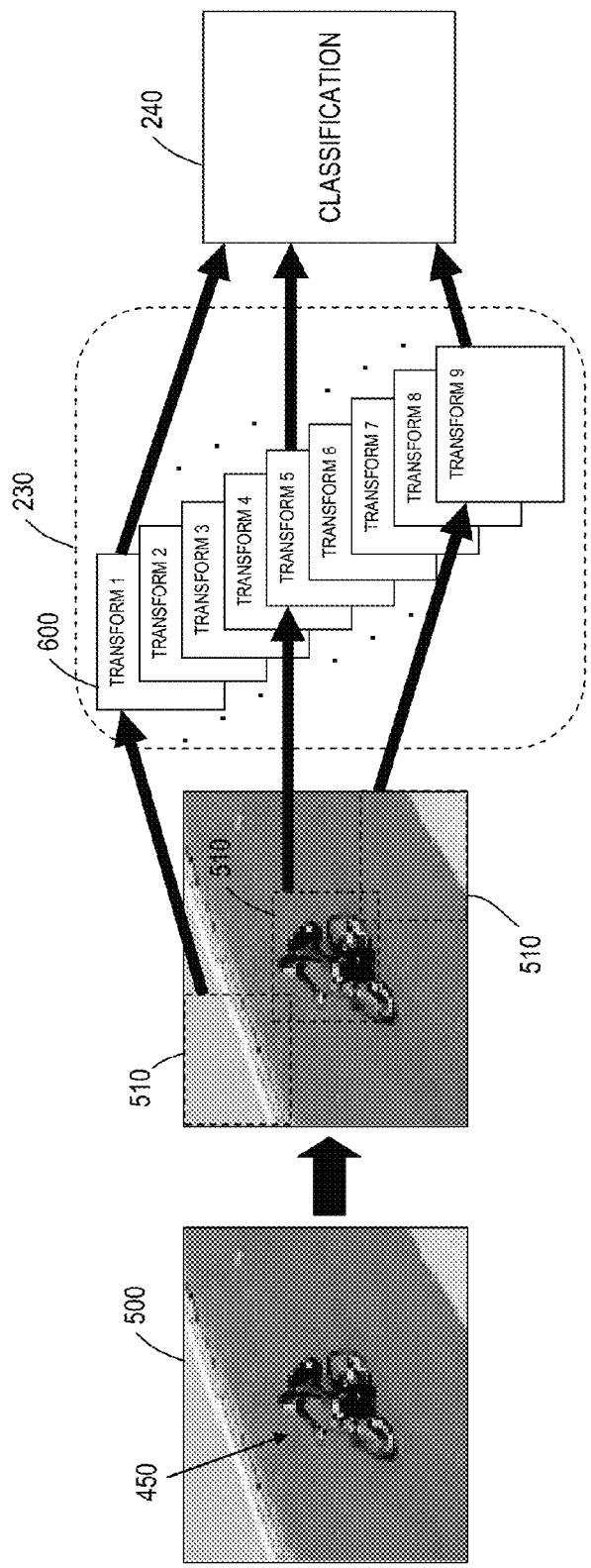
FIG. 7 illustrates an example discriminatory feature extraction module, in accordance with an embodiment of the invention.

In one embodiment, each image frame 150F may be divided into multiple image sub-frames 500 (FIG. 7). Each image sub-frame 500 of each image frame 150F has a corresponding index i indicating a location of the image sub-frame 500 within the image frame 150F, wherein i is a positive integer. Each image sub-frame 500 with index i has a corresponding classification unit 240 for assigning classification labels to features extracted from the image sub-frame 500. For each image sub-frame 500 of each image frame 150F, a corresponding classification unit 240 for the image sub-frame 500 assigns one or more classification labels, based on maps 410 and 420 corresponding to the image frame 150F, to any salient features and discriminative features extracted from the image sub-frame 500. The corresponding classification unit 240 only analyzes a portion 430 of the maps 410 and 420 that correspond to the image sub-frame 500. In one embodiment, the classification units 240 operate in parallel.

The system 200 further comprises a de-transduction unit 250 for converting neural spikes representing each pixel of each image frame 150F of the input video to pixels.

The system 200 further comprises a post-processing unit 260. For each image frame 150F, the post-processing unit 260 merges adjacent image sub-frames 500 of the image frame 150F to form a corresponding resulting image frame 150F (FIG. 5) that highlights/flags objects of interest detected within the image frame 150F. The resulting image frame 150F may be provided to an external output system 120 for display (e.g., an external monitor).

Each component of the system 200 (i.e., the transduction unit 210, the saliency feature extraction module 220, the discriminative feature extraction module 230, the classification units 240, the de-transduction unit 250, the post-processing unit 260) utilizes one or more core circuits 10 for implementing the functions/operations of the component.

In one embodiment, each core circuit 10 of a component of the system 200 operates as follows: each neuron 11 receives synaptic input comprising one or more neural spikes from one or more weighted synapses 31 connected to the neuron 11. The neural spikes received may be generated by other neurons 11 or may be from an external source. Each neural spike received is integrated into a membrane potential variable of the neuron 11 based on the weight of the synapse 31 that the neuron 11 received the neural spike from. Each neuron 11 produces outgoing neural spikes based on the integrated synaptic input and an activation function. In one embodiment, each neuron 11 generates an outgoing neural spike 130 when a membrane potential variable of the neuron 11 exceeds a pre-determined threshold.

In one embodiment, outgoing neural spikes generated by a particular set of neurons 11 within each feature extraction module 220, 230 are provided as output. The outgoing neural spikes generated by this set of neurons 11 encode salient/discriminative features extracted from an image frame 150F of the input video.

In one embodiment, the level of each feature extracted by each feature extraction module 220, 230 may be represented with outgoing neural spikes using a temporal coding scheme.

In one embodiment, outgoing neural spikes generated by a particular set of neurons 11 within each classification unit 240 are provided as output. The outgoing neural spikes generated by this set of neurons 11 encode class predictions for an image sub-frame 500 of an image frame 150F of the input video. In one embodiment, each classification unit 240 interprets features extracted from a corresponding image sub-frame 500 or classification labels assigned to the image sub-frame 500 into a human-readable format. For example, for each classification label, the sum of outgoing neural spikes generated for the classification label within a specified time window represents the number of votes for the classification label. The classification label with the most number of votes is interpreted as the predicted classification label.

In one embodiment, each classification unit 240 is trained using one of the following training techniques: stochastic gradient descent, a support vector machine, backpropagation, input/desired output covariance, and a restricted Boltzmann machine.

The features extracted by each feature extraction module 220, 230 may include mathematically defined features and/or learned features. In one embodiment, mathematically defined features are extracted using one or more of the following: edge extraction operators, texture extraction operators, and local averaging operators. In one embodiment, learned features are extracted using one or more of the following: a k-means clustering algorithm applied to training data, and an input/desired output covariance algorithm applied to training data.

Figure 5:
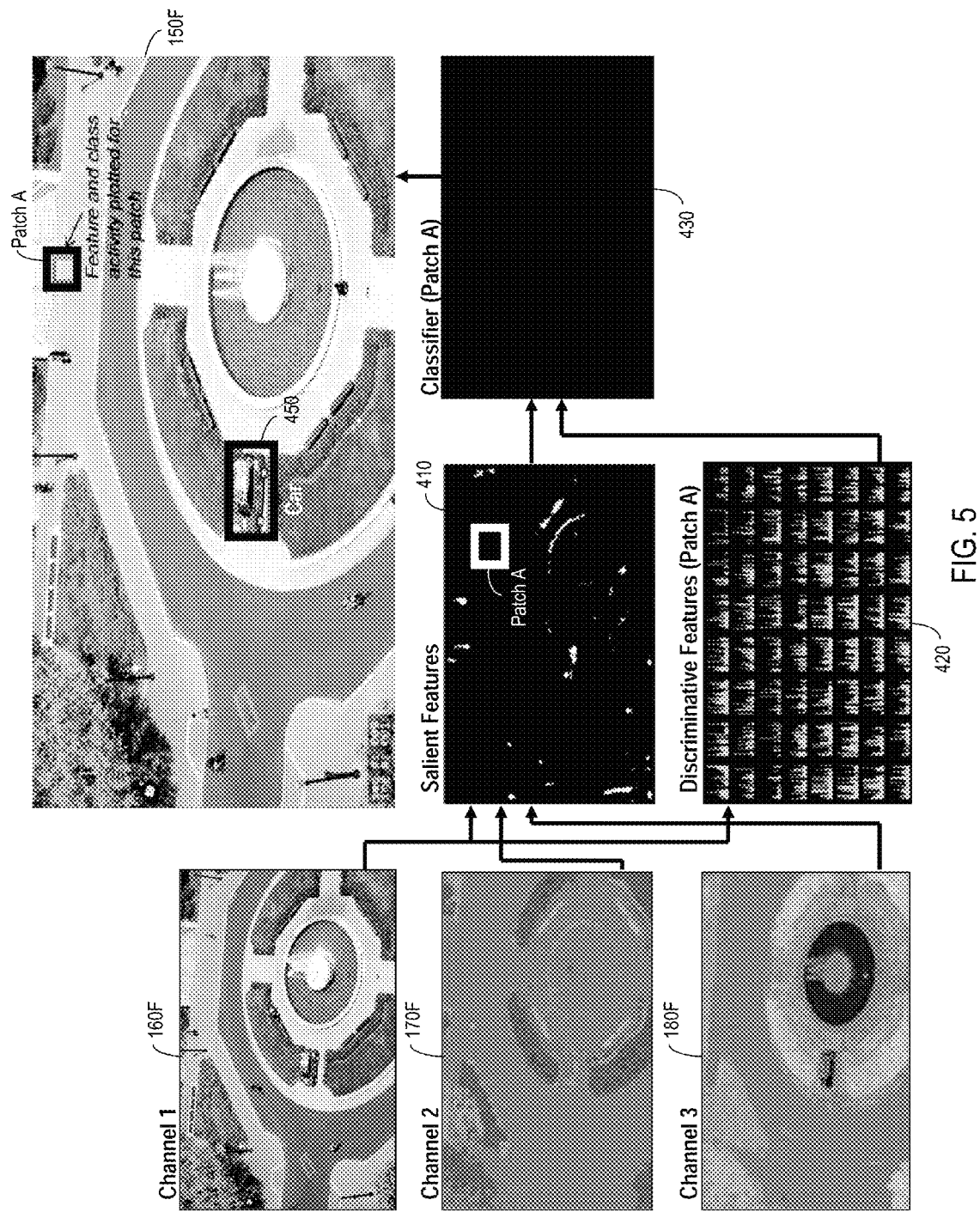
FIG. 5 illustrates performing scene understanding on an image frame, in accordance with an embodiment of the invention.

FIG. 5 illustrates performing scene understanding on an image frame 150F, in accordance with an embodiment of the invention. In one embodiment, the transduction unit 210 (FIG. 4) converts an input video received by the system 200 to a pre-determined color space. Specifically, the transduction unit 210 converts each image frame 150F to one or more channels, wherein each channel corresponds to a dimension of a color space.

For example, in one embodiment, an input video comprises a sequence of image frames 150F in the RGB color space. The transduction unit 210 converts each image frame 150F from the RGB color space to the L*a*b* color space. Specifically, the transduction unit 210 converts each image frame 150F to three separate channels: Channel 1 corresponding to the L* dimension of the L*a*b* color space, Channel 2 corresponding to the a* dimension of the L*a*b* color space, and Channel 3 corresponding to the b* dimension of the L*a*b* color space. In another embodiment, the transduction unit 210 converts each image frame 150F to fewer than, or more than, three separate channels.

The saliency feature extraction module 220 extracts salient features from each image frame of Channel 1 160F, each image frame of Channel 2 170F, and each image frame of Channel 3 180F. In one embodiment, the salient features extracted may include motion saliency features and/or spatial saliency features. For each image frame of Channel 1 160F . . . -Channel F 180F, the saliency feature extraction module 220 generates a corresponding map 410 representing the salient features extracted from the image frame 150F corresponding thereto.

Similarly, the discriminative feature extraction module 220 extracts salient features from each image frame of Channel 1 160F, each image frame of Channel 2 170F, and each image frame of Channel 3 180F. For each image frame 150F corresponding to said image frames for channels 160F-180F, the discriminative feature extraction module 220 generates a corresponding map representing the discriminative features extracted from the corresponding image frames 160F, 170F and 180F.

Figure 9:
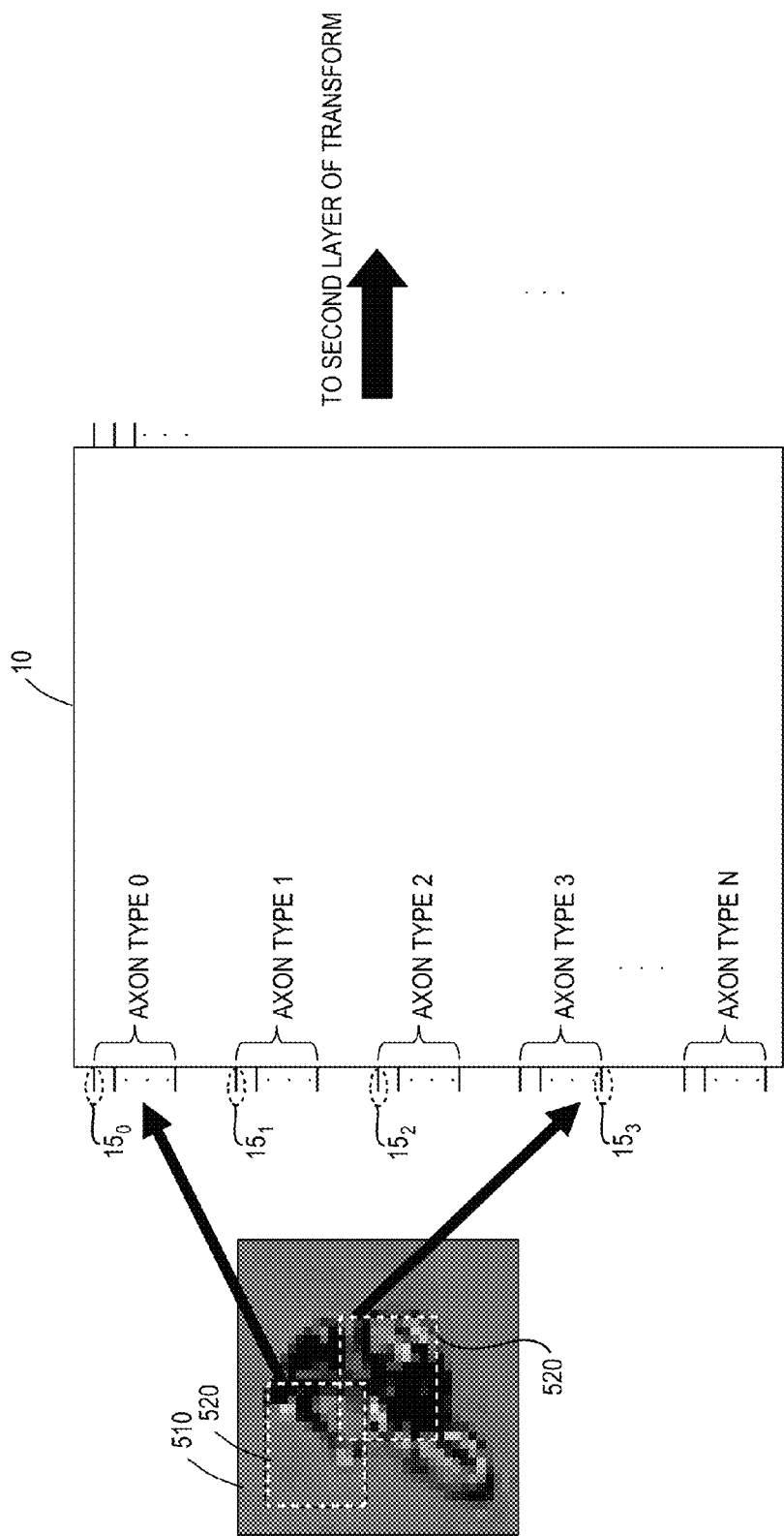
FIG. 9 illustrates assigning axons to the input of a core circuit, in accordance with an embodiment of the invention.

In one embodiment, each image frame 150F may be divided into multiple image sub-frames 500 (FIG. 7), wherein each image sub-frame 500 comprises multiple input spaces 510 (FIG. 7). Each input space 510 is in turn divided into multiple input regions, such as multiple image sub-patches 520 (FIG. 9). Referring again to FIG. 5, an example of an image sub-patch 520 referenced as "Patch A" is illustrated within the image frame 150F. A map 420 representing discriminative features extracted from the image sub-patch Patch A is also shown in FIG. 5.

Each image sub-frame 500 of each image frame 150F has a corresponding classification unit 240 for assigning a classification label to salient features and/or discriminative features extracted from the image sub-frame 500. In one embodiment, a classification unit 240 analyzes at least one portion of at least one map representing salient features and/or discriminative features extracted from the image sub-frame 500. For example, a classification unit 240 may analyze a portion 430 of the map 410, wherein the portion 430 may represent salient features extracted from the image sub-patch Patch A.

For each image frame 150F, the post-processing unit 260 merges adjacent image sub-frames 500 of the image frame 150F to form a corresponding resulting image frame 150F that highlights objects of interest detected within the image frame 150F. For example, as shown in FIG. 5, a car within the image frame 150F is flagged as an object of interest.

Figure 6:
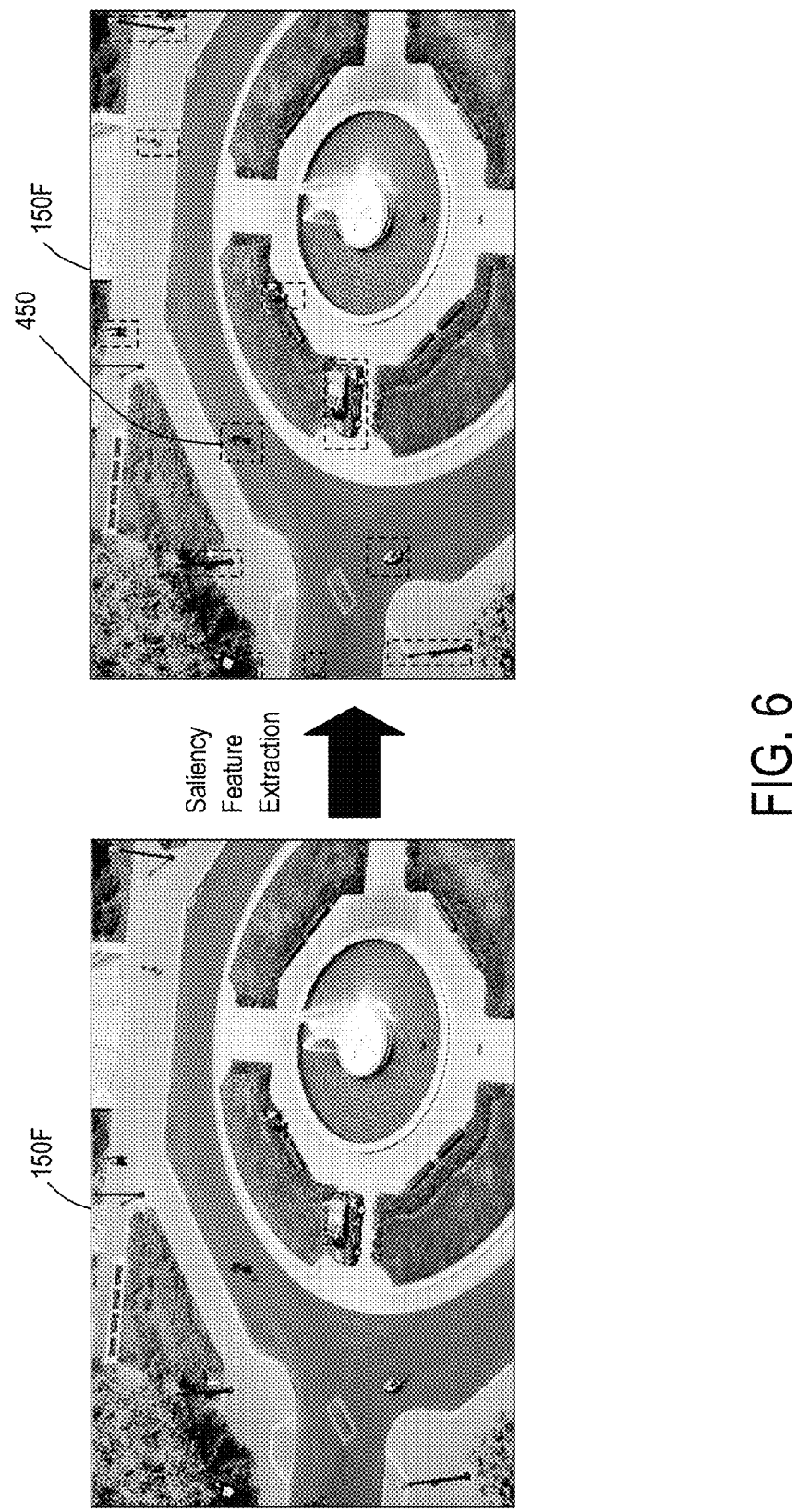
FIG. 6 illustrates an example image frame highlighting multiple regions of interest within a visual scene, in accordance with an embodiment of the invention.

FIG. 6 illustrates an example image frame 150F highlighting multiple regions of interest 450 within a visual scene, in accordance with an embodiment of the invention. The saliency feature extraction module 220 extracts salient features from an image frame 150F. Based on the salient features extracted, classification units 240 corresponding to image sub-frames 500 of the image frame 150F assign classification labels to the salient features extracted. If the classification units 240 detect objects of interest based on the salient features extracted, portions of the image frame 150F including the detected objects of interest are highlighted as regions of interest 450. As shown in FIG. 6, the regions of interest 450 include objects of interest in motion (e.g., a cyclist, a person walking) and objects of interest that are not in motion (e.g., a parked car, a lamp post).

FIG. 7 illustrates an example discriminatory feature extraction module 230, in accordance with an embodiment of the invention. The discriminative features extracted by the discriminatory feature extraction module 230 may include learned features. In FIG. 7, an image sub-frame 500 of an image frame 150F is provided to the discriminatory feature extraction module 230.

The image sub-frame 500 has a corresponding classification unit 240 for assigning a classification label to salient features and/or discriminative features extracted from the image sub-frame 500. For example, if the classification unit 240 detects a cyclist within the image sub-frame 500 based on the salient features and/or discriminative features extracted from the image sub-frame 500, the cyclist is flagged as an object of interest, and a portion of the image sub-frame 500 including the cyclists is highlighted as a region of interest 450.

In one embodiment, the discriminatory feature extraction module 230 comprises multiple two-layered feature extractors 600. The image sub-frame 500 is divided into multiple input spaces 510. Each input space 510 has a corresponding feature extractor 600. As described in detail later herein, each feature extractor 600 comprises a first layer 610 of core circuits 10 and one or more subsequent layers 620 of core circuits 10. Synaptic connectivity information (e.g., synaptic weights and effective synaptic strengths) for each feature extractor 600 is set based on a corresponding transform.

For example, in one embodiment, the size dimension of the image sub-frame 500 is 96×96. The image sub-frame 500 is divided into a total of nine input spaces 510, wherein the size dimension of each input space 510 is 32×32. The total number of feature extractors 600 required for the entire image sub-frame 500 is nine. Each feature extractor has a corresponding transform (e.g., as illustrated in FIG. 9, TRANSFORM 1 for a feature extractor corresponding to a first input space 510, TRANSFORM 5 for a feature extractor corresponding to a fifth input space 510, . . . , and TRANSFORM 9 for a feature extractor corresponding to a ninth input space 510, etc.).

In one embodiment, the saliency feature extraction module 220 comprises multiple two-layered feature extractors 600.

Figure 8:
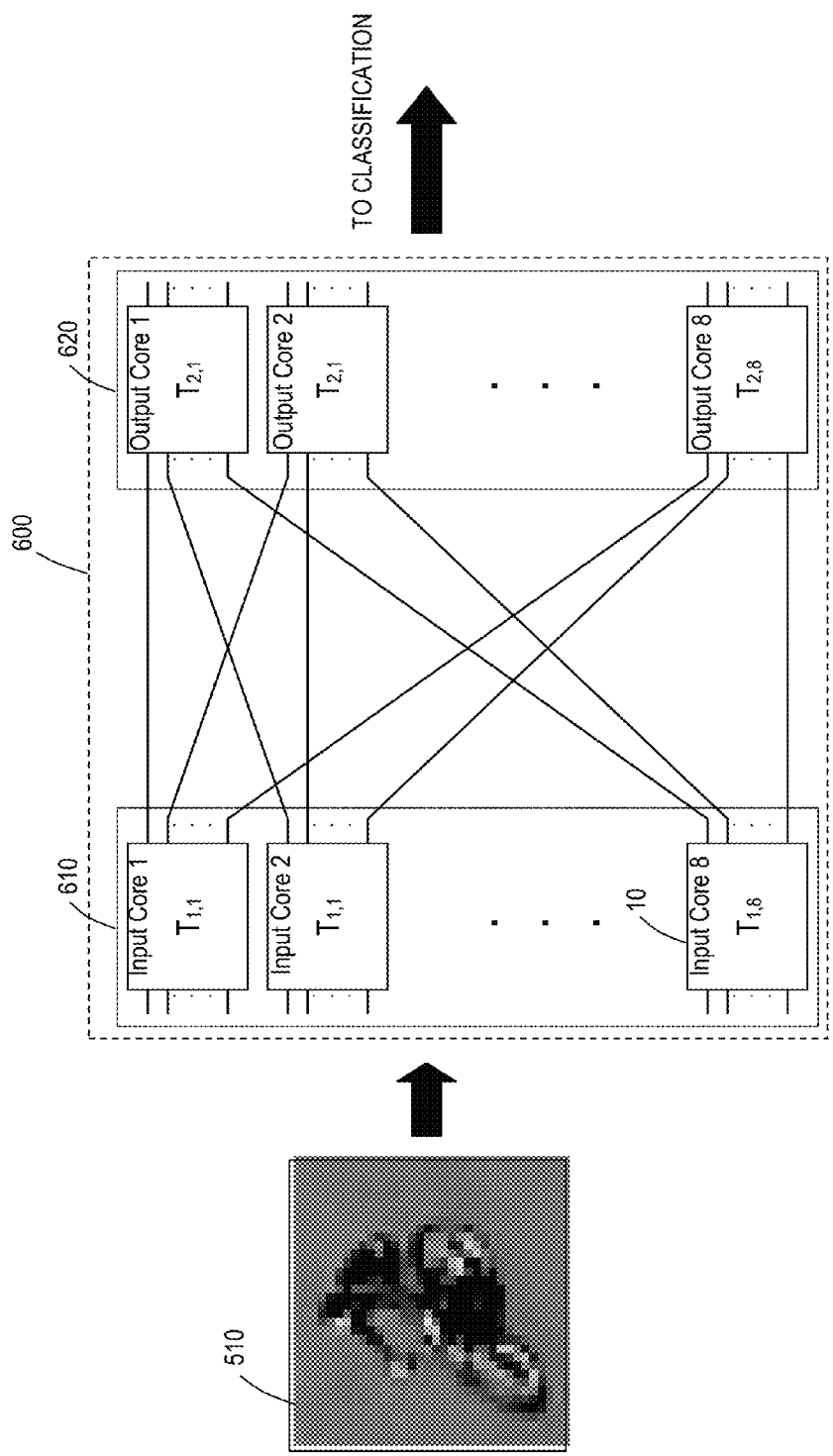
FIG. 8 illustrates an example feature extractor for an input space, in accordance with an embodiment of the invention.

FIG. 8 illustrates an example feature extractor 600 for an input space 510, in accordance with an embodiment of the invention. In one embodiment, the feature extractor 600 is a two-layered feature extractor comprising a first layer 610 of core circuits 10, and a second layer 620 of core circuits 10. Each layer 610, 620 includes m core circuits 10, wherein m is a positive integer.

The first layer 610 includes m input core circuits 10 for receiving a set of input data comprising neural spikes representing each pixel of the input space 510, and extracting a first set of features from the set of input data. The second layer 620 includes m output core circuits 10 for outputting a second set of features based on the first set of features. The feature extractor 600 utilizes a total of 2 m core circuits 10.

As shown in FIG. 8, in one embodiment, a feature extractor 600 for a 32×32 input space 510 comprises a total of 16 core circuits 10, wherein each layer 610, 620 comprises 8 core circuits 10 (i.e., m=8). The first layer 610 comprises input core circuits Input Core 1, Input Core 2, . . . , and Input Core 8. The second layer 620 comprises output core circuits Output Core 1, Output Core 2, . . . , and Output Core 8.

The set of input data received is assigned to axons 15 of the input core circuits 10. A neuron 11 generates an output (e.g., an outgoing neuronal firing event) when a membrane potential variable V of the neuron 11 reaches a pre-determined threshold value Th. Output generated by the input core circuits 10 comprises the first set of features that the input core circuits 10 extracted from the set of input data. Each feature of the first set of features is based on a subset of the set of input data. In one example implementation, each feature of the first set of features represents a discriminative feature/characteristic for a subset of the input space 510 (e.g., an image sub-patch 520). In an alternative example implementation, each feature of the first set of features represents a salient feature/characteristic for a subset of the input space 510 (e.g., an image sub-patch 520).

Output generated by neurons 11 of the input core circuits 10 are permuted/reordered and routed to axons 15 of the output core circuits 10. Output generated by the output core circuits 10 comprises the second set of features. In one embodiment, the second set of features represent a more complex set of features than the first set of features (e.g., the first set of features may represent local features, whereas the second set of features may represent global features). Each feature of the second set of features can be based on the entire input space 510. In one example implementation, each feature of the second set of features represents a discriminative feature/characteristic for the entire input space 510. In an alternative example implementation, each feature of the second set of features represents a salient feature/characteristic for the entire input space 510.

In one embodiment, each core circuit 10 includes a built-in router for permuting outgoing neuronal firing events generated by the neurons 11 of the core circuit 10. For example, the router 55 (FIG. 1) of a core circuit 10 may be further configured to permute output neuronal firing events generated by the neurons 11 of the core circuit 10.

The crossbar 12 of each core circuit 10 of the feature extractor 600 is preferably implemented (i.e., constructed) based on a corresponding transform. A transform corresponding to a core circuit 10 may be used to initialize synaptic connectivity information for the core circuit 10, such as synaptic weights and effective synaptic strengths.

With reference to the example shown in FIG. 8, let $T_{1,i}$ generally denote a transform corresponding to an input core circuit 610, e.g., Input Core i, wherein i={1, ..., m}. Synaptic connectivity information for an input core circuit Input Core i is initialized/set using a corresponding transform $T_{1,i}$. Let $T_{2,i}$ generally denote a transform corresponding to an output core circuit Output Core i, wherein i={1, ..., m}. Synaptic connectivity information for an output core circuit Output Core i is initialized/set using a corresponding transform $T_{2,i}$.

FIG. 9 illustrates assigning axons 15 to the input of a core circuit 10, in accordance with an embodiment of the invention. As discussed with regard to FIG. 2, each axon 15 may have a corresponding axon type. Referring again to FIG. 9, Let input region 520 denote a subset of an input space 510, wherein the size of the input region 520 is smaller than the size of the input space 510. And each axon type (AXON TYPE 0 ... AXON TYPE N corresponds to a particular receptive filter for processing a specific input region 520 of the input space 510, by looking for a particular shape in the specific input region 520 of the input data 510.

In one embodiment, there are four different axon types: Axon Type 0, Axon Type 1, Axon Type 2, and Axon Type 3. As discussed with regard to FIG. 8, the feature extractor 600 may include an input core circuit 10 and an output core circuit 10. Referring again to FIG. 9, each core circuit may include at least a first set of axons $15_0$ of axon type Axon Type 0, a second set of axons $15_1$ of axon type Axon Type 1, a third set of axons $15_2$ of axon type Axon Type 2, and a fourth set of axons $15_3$ of axon type Axon Type 3. If each of the four axon types in this example corresponds to a binary receptive filter, each corresponding neuron 11 will preferably also have a total of four binary receptive filters. Whether an axon type is inhibitory or excitatory depends on a corresponding transform for the input core circuit 10.

As stated above, each input space 510 may be further divided into multiple input regions, such as multiple image sub-patches 520 (FIG. 9). Each set of axons 15 of a particular axon type are assigned at least one image sub-patch 520 of the input space 510. For example, in one embodiment, each 32×32 input space 510 is divided into multiple 8×8 image sub-patches 520. Axons 15 with a particular axon type are assigned at least one 8×8 input sub-region. For example, as shown in FIG. 9, one 8×8 image sub-patch 520 is assigned the first set of axons $15_0$ with axon type Axon Type 0, and a different 8×8 image sub-patch 520 is assigned to the fourth set of axons $15_3$ with axon type Axon Type 3.

The input core circuits 10 (FIG. 8) compute multiple inner products by simultaneously processing different image sub-patches 520 using receptive filters, and extract a first set of discriminative features based on the inner products computed. Each discriminative feature of the first set is a combination of two or more inner products. Specifically, each neuron 11 of each input core circuit 10 is configured to compute multiple inner products by matching receptive filters to different image sub-patches 520, compute linear combinations of the inner products computed, and generate output representing a discriminative feature extracted from the input data based on the linear combinations computed.

In one embodiment, the receptive filters are learned by applying K-means clustering to training data. For example, K-means clustering may be applied to training data to learn real-valued centroids of the training data. The centroids are then quantized to obtain binary synaptic weights for synapses 31 of an input core circuit 10.

The output core circuits 10 (FIG. 8) receive the first set of features extracted by the input core circuits 10, and generate a second set of features by combining the first set of features based on learned synaptic connectivity information. For each output core circuit i, effective synaptic strengths between axon types and neurons 11 of the output core circuit 10 are set using a corresponding transform $T_{2,i}$.

Each output core circuit 10 (FIG. 8) of each subsequent layer 620 has learned synaptic weights. In one embodiment, a linear classifier is trained to produce a discriminant weight matrix K. The linear classifier is trained based on features extracted from the first set 610 of core circuits 10. For example, let N denote the total number of features extracted from the first layer 610 of core circuits 10, and let M denote the total number of available classifications/classes to classify objects of interest as. The weight matrix K produced by the linear classifier is an N×M matrix.

In one embodiment, each row of the weight matrix K represents relevance of a particular feature in predicting different classifications.

In one embodiment, synaptic weights for an output core circuit 10 are set using a covariance-based algorithm. For example, a covariance matrix C of the weight matrix K is computed by estimating the expected value of $K^tK$, wherein $K^t$ denotes a transpose of the weight matrix K. Each entry of the covariance matrix C represents a covariance between a pair of features. If K is a 256×N matrix, the covariance matrix C is a 256×256 real-valued matrix. The covariance matrix C is then quantized into a trinary matrix containing the values −1, 0, or 1. The quantized matrix is used to set synaptic weights for the output core circuit 10. For example, a synaptic weight between an axon i and a neuron j of the output core circuit 10 is turned ON if an element $C_{i,j}$ of the quantized matrix has the same sign as a strength value between the axon i and the neuron j. On the other hand, a synaptic weight between an axon i and a neuron j of the output core circuit 10 is turned OFF if an element $C_{i,j}$ of the quantized matrix C has a sign that is different from a strength value between the axon i and the neuron j.

In one embodiment, one or more correlation coefficients for the features is determined based on the weight matrix K.

For each input space 510, a corresponding classification unit 240 selects features from one input region 520 of the input space 510 at a time. In one embodiment, features are ranked based on an $L_2$-norm of a weight vector obtained from a regularized support vector machine (SVM). Only features with highest rank are retained.

Figure 10:
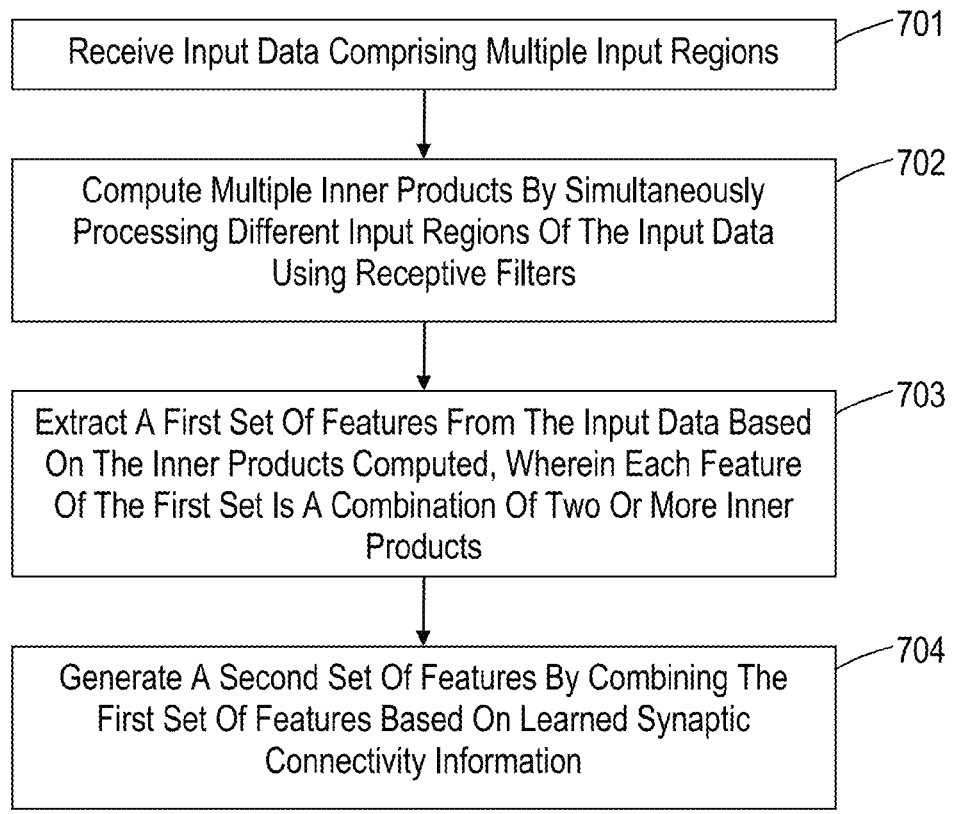
FIG. 10 illustrates a flowchart of an example process for feature extraction, in accordance with an embodiment of the invention.

FIG. 10 illustrates a flowchart of an example process 700 for feature extraction, in accordance with an embodiment of the invention. In process block 701, receive input data comprising multiple input regions. In process block 702, compute multiple inner products by simultaneously processing different input regions of the input data using receptive filters. In process block 703, extract a first set of features from the input data based on the inner products computed, wherein each feature of the first set is a combination of two or more inner products. In process block 704, generate a second set of features by combining the first set of features based on learned synaptic connectivity information.

In one embodiment, one or more input core circuits 10 (FIG. 8) may be configured to perform process blocks 701-703, as described above. Further, one or more output core circuits 10 (FIG. 8) may be configured to perform process block 704, as described above.

Figure 11:
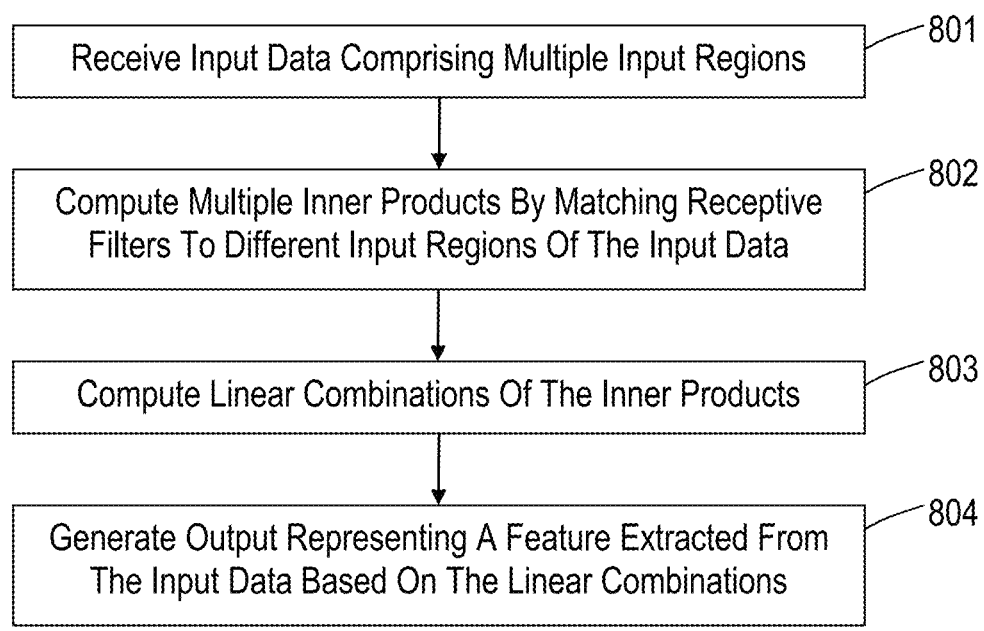
FIG. 11 illustrates a flowchart of an example process for simultaneously processing different input regions of the input data using receptive filters, in accordance with an embodiment of the invention.

FIG. 11 illustrates a flowchart of an example process 800 for simultaneously processing different input regions of the input data using receptive filters, in accordance with an embodiment of the invention. In process block 801, receive input data comprising multiple input regions. In process block 802, compute multiple inner products by matching receptive filters to different input regions of the input data. In process block 803, compute linear combinations of the inner products. In process block 804, generate output representing a feature extracted from the input data based on the linear combinations.

In one embodiment, one or more input core circuits 10 (FIG. 8) may be configured to perform process blocks 801-804, as described above.

Figure 12:
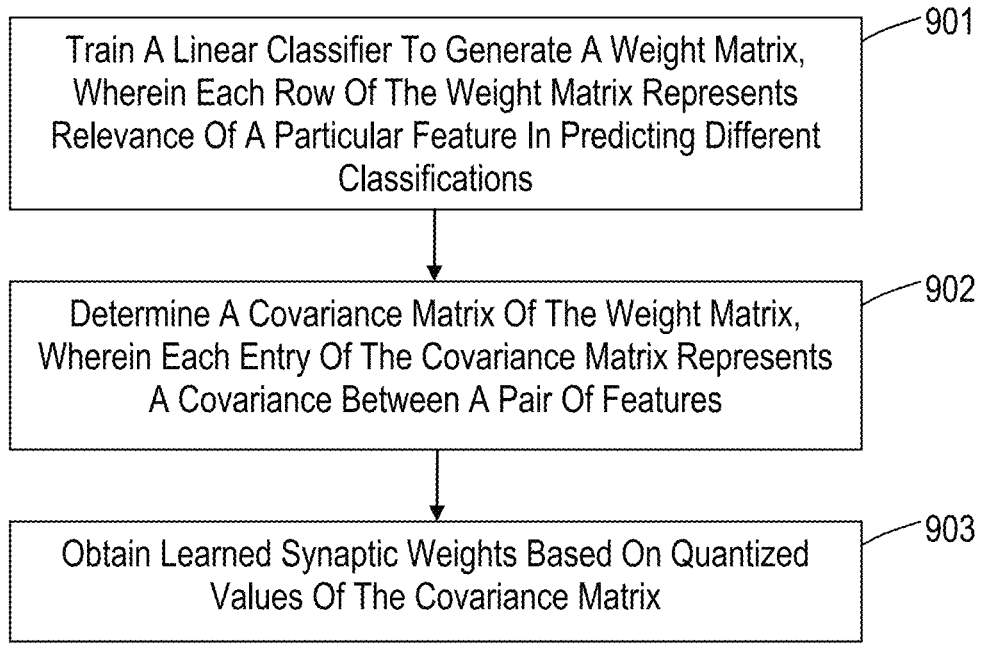
FIG. 12 illustrates a flowchart of an example process for obtaining learned synaptic weights, in accordance with an embodiment of the invention.

FIG. 12 illustrates a flowchart of an example process 900 for obtaining learned synaptic weights, in accordance with an embodiment of the invention. In process block 901, train a linear classifier to generate a weight matrix, wherein each row of the weight matrix represents relevance of a particular feature in predicting different classifications. In process block 902, determine a covariance matrix of the weight matrix, wherein each entry of the covariance matrix represents a covariance between a pair of features. In process block 903, compute linear combinations of the inner products. In process block 804, obtain learned synaptic weights based on quantized values of the covariance matrix.

Figure 13:
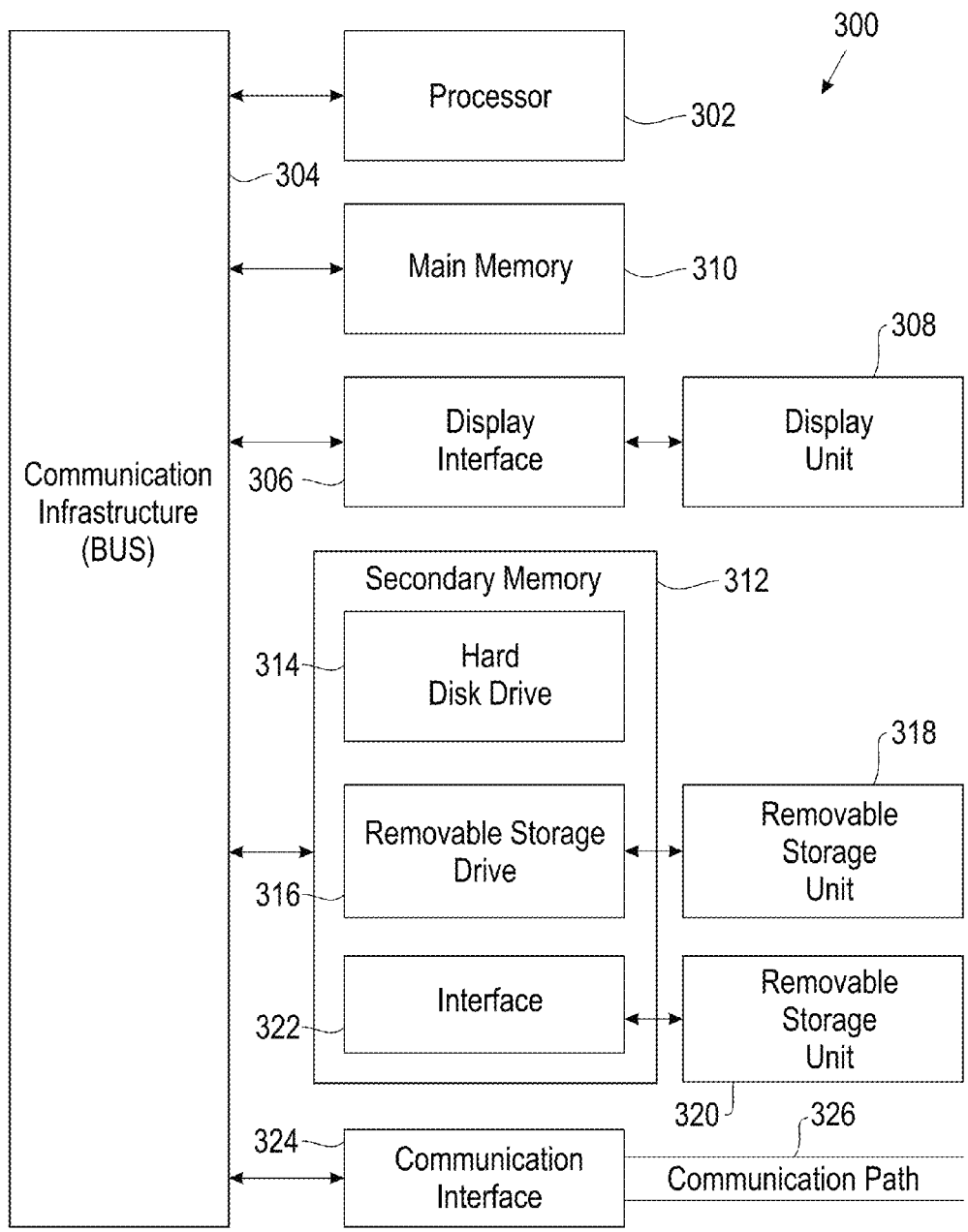
FIG. 13 is a high level block diagram showing an information processing system useful for implementing one embodiment of the present invention.

FIG. 13 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for learning and extracting features using a neurosynaptic system. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neurosynaptic system comprising:
a first set of hardware neurosynaptic core circuits configured to:
receive input data comprising different input regions, wherein the input data comprises at least one of audio data or visual data; and
extract a first set of features from the input data, wherein features of the first set are computed based on the different input regions; and
a second set of hardware neurosynaptic core circuits configured to:
receive the first set of features; and
generate output data comprising a second set of features, wherein the second set of features are linear combinations computed by combining the first set of features based on synaptic connectivity information of the second set of hardware neurosynaptic core circuits, and each feature of the second set of features represents a characteristic across the different input regions;
wherein the output data is provided to a classifier comprising a third set of hardware neurosynaptic core circuits for object classification, the classifier configured to classify each object of interest within the input data based on the output-data; and
wherein each hardware neurosynaptic core circuit comprises a plurality of electronic neurons, a plurality of electronic axons, and a plurality of electronic synapses for interconnecting the neurons with the axons.

2. The system of claim 1, wherein the input data comprises at least one of a sequence of images, audio, or videos, and the output data generated is used for scene understanding.

3. The system of claim 2, wherein:
for each hardware neurosynaptic core circuit of the first set of hardware neurosynaptic core circuits:
one or more axons of the hardware neurosynaptic core circuit are of an axon type corresponding to a particular receptive filter configured to process a particular input region of the input data.

4. The system of claim 3, wherein each receptive filter processes a particular input region of the input data based on the presence of a particular shape in the particular input region of the input data.

5. The system of claim 3, wherein:
each hardware neurosynaptic core circuit of the first set of hardware neurosynaptic core circuits is configured to extract a first set of features from the input data by:
computing multiple inner products, wherein the inner products are computed by simultaneously processing different input regions of the input data using receptive filters, and wherein the receptive filters are matched to different input regions of the input data; and
computing linear combinations of the inner products computed, wherein each feature of the first set is a combination of two or more inner products computed.

6. The system of claim 2, wherein the synaptic connectivity information includes learned synaptic weights for synapses of the second set of hardware neurosynaptic core circuits.

7. The system of claim 6, further comprising:
a linear classifier for generating a weight matrix, wherein each row of the weight matrix represents a relevance of a particular feature in predicting different classifications;
wherein the linear classifier is trained based on a set of features extracted from the input data using the first set of hardware neurosynaptic core circuits; and
wherein learned synaptic weights for synapses of a hardware neurosynaptic core circuit of the second set of hardware neurosynaptic core circuits are obtained based on the weight matrix.

8. The system of claim 7, wherein:
the synaptic weights for the synapses of the hardware neurosynaptic core circuit are set based on quantized values of a covariance matrix of the weight matrix, wherein the covariance matrix includes multiple entries, and wherein each entry of the covariance matrix represents a covariance between a pair of features.

9. The system of claim 7, wherein one or more correlation coefficients for the features is determined based on the weight matrix.

10. The system of claim 1, wherein:
the input data comprises an image with multiple image sub-patches;
each neuron of the first set of hardware neurosynaptic core circuits has a receptive filter for each image sub-patch; and
the system extracts one or more salient features and one or more discriminative features from the input data in parallel.

11. A computerized method for feature extraction, comprising:
at a first set of hardware neurosynaptic core circuits:
receiving input data comprising different input regions, wherein the input data comprises at least one of audio data or visual data; and
extracting a first set of features from the input data, wherein features of the first set are computed based on the different input regions; and
at a second set of hardware neurosynaptic core circuits:
receiving the first set of features; and
generating output data comprising a second set of features, wherein the second set of features are linear combinations computed by combining the first set of features based on synaptic connectivity information of the second set of hardware neurosynaptic core circuits, and each feature of the second set of features represents a characteristic across the different input regions;
wherein the output data is provided to a classifier comprising a third set of hardware neurosynaptic core circuits for object classification, the classifier configured to classify each object of interest within the input data based on the output-data; and
wherein each hardware neurosynaptic core circuit comprises a plurality of electronic neurons, a plurality of electronic axons, and a plurality of electronic synapses for interconnecting the neurons with the axons.

12. The method of claim 11, wherein extracting a first set of features from the input data, comprises:
computing multiple inner products, wherein the inner products are computed by simultaneously processing different input regions of the input data using receptive filters, and wherein the receptive filters are matched to different input regions of the input data; and computing linear combinations of the inner products computed, wherein each feature of the first set is a combination of two or more inner products computed.

13. The method of claim 12, wherein each receptive filter processes a particular input region of the input data by looking for a particular shape in the particular input region of the input data.

14. The method of claim 11, wherein the synaptic connectivity information includes learned synaptic weights.

15. The method of claim 14, further comprising:
training a linear classifier to generate a weight matrix, wherein each row of the weight matrix represents a relevance of a particular feature in predicting different classifications, wherein the linear classifier is trained based on a set of features extracted from the input data, and wherein the learned synaptic weights are obtained based on the weight matrix.

16. The method of claim 15, further comprising:
determining a covariance matrix of the weight matrix, wherein the covariance matrix includes multiple entries, and wherein each entry of the covariance matrix represents a covariance between a pair of features;
wherein the learned synaptic weights are quantized values of the covariance matrix.

17. The method of claim 16, further comprising:
based on the weight matrix, determining one or more correlation coefficients for the features.

18. The method of claim 11, wherein:
the input data comprises is image with multiple image sub-patches; and
each image sub-patch has a corresponding receptive filter.

19. The method of claim 11, further comprising:
extracting one or more salient features and one or more discriminative features from the input data in parallel.

20. A non-transitory computer program product for feature extraction, the computer program product comprising a computer-readable storage medium having program code embodied therewith, the program code being executable by a computer to:
at a first set of hardware neurosynaptic core circuits:
receiving input data comprising different input regions, wherein the input data comprises at least one of audio data or visual data; and
extracting a first set of features from the input data, wherein features of the first set are computed based on the different input regions; and
at a second set of hardware neurosynaptic core circuits:
receiving the first set of features; and
generating output data comprising a second set of features, wherein the second set of features are linear combinations computed by combining the first set of features based on synaptic connectivity information of the second set of hardware neurosynaptic core circuits, and each feature of the second set of features represents a characteristic across the different input regions;
wherein the output data is provided to a classifier comprising a third set of hardware neurosynaptic core circuits for object classification, the classifier configured to classify each object of interest within the input data based on the output-data; and
wherein each hardware neurosynaptic core circuit comprises a plurality of electronic neurons, a plurality of electronic axons, and a plurality of electronic synapses for interconnecting the neurons with the axons.

* * * * *